(12) United States Patent
Ai

(10) Patent No.: US 6,548,797 B1
(45) Date of Patent: Apr. 15, 2003

(54) APPARATUS AND METHOD FOR MEASURING A WAVEFRONT USING A SCREEN WITH APERTURES ADJACENT TO A MULTI-LENS ARRAY

(75) Inventor: Chia-Yu Ai, Tucson, AZ (US)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 09/692,180

(22) Filed: Oct. 20, 2000

(51) Int. Cl.⁷ .................................................. G01J 1/20
(52) U.S. Cl. ..................................... 250/201.9; 356/121
(58) Field of Search .......................... 250/208.1, 201.9; 356/121, 122, 127, 124, 123, 371; 359/559, 566, 291, 294

(56) References Cited

U.S. PATENT DOCUMENTS

| | | |
|---|---|---|
| 3,973,953 A | 8/1976 | Montgomery |
| 4,405,232 A | 9/1983 | Mansell |
| 4,413,909 A | 11/1983 | Pohle |
| 4,438,330 A | 3/1984 | Hardy |
| 4,490,039 A | 12/1984 | Bruckler et al. ............ 356/121 |
| 4,620,790 A | 11/1986 | Hufnagel |
| 4,667,103 A | 5/1987 | Watson et al. |
| 4,725,138 A | 2/1988 | Wirth et al. |
| 4,737,621 A | 4/1988 | Gonsiorowski et al. ..... 250/201 |
| 5,233,174 A | 8/1993 | Zmek |
| 5,294,971 A | 3/1994 | Braunecker et al. |
| 5,300,766 A | 4/1994 | Granger et al. |
| 5,493,391 A | 2/1996 | Neal et al. |
| 5,629,765 A | 5/1997 | Schmutz |
| 5,680,200 A | 10/1997 | Sugaya et al. ................ 355/53 |
| 5,754,299 A | 5/1998 | Sugaya et al. .............. 356/401 |
| 5,825,476 A | 10/1998 | Abitol et al. |
| 5,864,381 A | 1/1999 | Neal et al. |
| 5,912,731 A | 6/1999 | Delong et al. .............. 356/121 |
| 5,936,720 A | 8/1999 | Neal et al. |
| 6,052,180 A | 4/2000 | Neal et al. |
| 6,130,419 A | 10/2000 | Neal |
| 6,184,974 B1 * | 2/2001 | Neal et al. ................ 250/201.9 |

FOREIGN PATENT DOCUMENTS

| | | |
|---|---|---|
| EP | 0 833 193 A2 | 4/1998 |
| EP | 1 079 223 A1 | 2/2001 |
| JP | 02238338 | 9/1990 |

OTHER PUBLICATIONS

Wave Front Sciences Optics and Instrumentation, *Complete Light Analysis System™*, (7 pages).
Adaptive Optics Associates publication, *Adaptive Optics Associates, Inc. Company History*, (9 pages).

* cited by examiner

*Primary Examiner*—Stephone B. Allen
*Assistant Examiner*—Bradford Hill
(74) *Attorney, Agent, or Firm*—Finnegan, Henderson, Farabow, Garrett & Dunner, L.L.P.

(57) ABSTRACT

A wavefront sensor is provided to determine characteristics of an incoming distorted energy beam, such as a tilt angle and/or a degree of focus. The sensor includes a multi-lens array, a screen, and a beam detector. The multi-lens array focuses the energy beam to a multiple focal points. The screen, positioned adjacent to the multi-lens array, has at least one aperture to allow a portion of the energy beam to pass, while blocking the remainder of the energy beam from arriving at the multi-lens array. Each aperture is aligned with a lens of the multi-lens array. The beam detector detects the resulted focal point(s) of the energy beam passing through the corresponding aperture(s) and determines the characteristics of the passing energy beam. The screen may include a central aperture to measure a local tilt angle of a segment of incoming wavefront entering a lens of the lens array. The screen may also include a plurality sets of apertures configured to align in a plurality of directions, each set of apertures measuring a degree of focus of the incoming wavefront along the corresponding direction. The screen may further include a combination of central aperture and a plurality sets of apertures aligned in a plurality of directions to simultaneously measure the local tilt angle and degree of focus of the incoming wavefront.

47 Claims, 9 Drawing Sheets

APPARATUS AND METHOD FOR MEASURING A WAVEFRONT USING A SCREEN WITH APERTURES ADJACENT TO A MULTI-LENS ARRAY

BACKGROUND OF THE INVENTION

1. Field of the Invention

This invention relates to an apparatus and method for determining characteristics of a wavefront. More particularly, the invention relates to an apparatus and method for increasing the dynamic range of a wavefront sensor in measuring a tilt angle and a degree of focus of the wavefront.

2. Description of the Related Art

Wavefront sensors have been used, for example, in camera focusing technology to measure the distance between an object and a device, e.g., the camera, by sending out a signal wavefront and to measure the round trip time of such signal wavefront. Knowing the distance, the camera can focus properly. Particularly, wavefront sensors include elements which provide information about phase distortions or aberrations in a received wavefront, and which analyze, measure, and provide information signals to correct for the aberrations received in optical wavefronts. These phase distortions are produced in an image by many causes, such as a thermal expansion or contraction of the device due to varying temperatures, which changes distances between lenses and/or mirrors therein.

In the laser art, wavefront sensors, such as Hartman sensors, have been used to measure the wave front quality of a laser beam. In measuring the wave front quality of a laser beam, two major components of measurement are determination of a tilt angle and determination of a degree of focus of the incoming wavefront. Tilt angle is the local slope of a segmented wavefront over the dynamic range of the wavefront sensor. The degree of focus is the low order aberration of the aberration polynomials representing the local curvature of the segmented wavefront over the dynamic range of the wavefront sensor. Dynamic range is the operating range of the wavefront sensor generally measured, in $\mu$m. The wavefront of incoming beam is defined as a surface that is normal to the local propagation direction of the beam. Wave-aberration polynomial represents the departure of the actual wavefront from a perfect spherical reference surface.

A Hartman sensor generally employs an array of lenses to focus an incoming laser beam to a set of focal points. An array of optical detectors detects the focal points and transmits an output to a measuring unit. The measuring unit compares the light intensity at various focal points on the detector with a reference beam or with a set of nominal values. Based on the readings of the measuring unit, an adaptive optical system then corrects a tilt angle and a degree of focus in the optical wavefront. The sensor also compensates for errors or deviations within the laser or within the atmosphere through which the laser beam travels.

Figure 1:
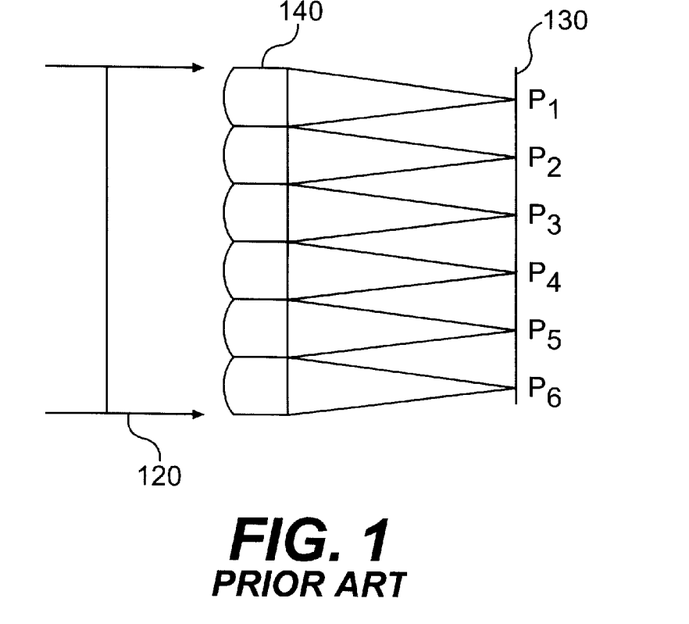
FIG. 1 is a schematic side view of a non-distorted wavefront entering a conventional wavefront sensor.

FIG. 1 illustrates a perfectly straight, non-distorted, wavefront 120 passing through a multiple lens array 140 (an array of six lenses are shown for exemplary purposes), which have a uniform focal length. Multiple lens array 140 splits incoming wavefront 120 into a series of subapertures, each of which creates a focal point (one of $P_1$–$P_6$) on a detector 130. The wavefront tilt angle is determined by the position of each focal point P with respect to the corresponding reference focal points. The wavefront itself can be reconstructed by integrating the wavefront tilt angle over the range of lens array 140.

Detector 130 can be a CCD camera which is assigned to a multiple fields (six in this example) corresponding to the number of lenses in lens array 130 to detect where focal points are and to measure the local tilt angle with respect to nominal or reference focal points. Focal points $P_1$–$P_6$ of the perfectly straight, non-distorted wavefront 120, as illustrated in FIG. 1, are nominal or reference focal points whereby tilt angle is zero.

Figure 2:
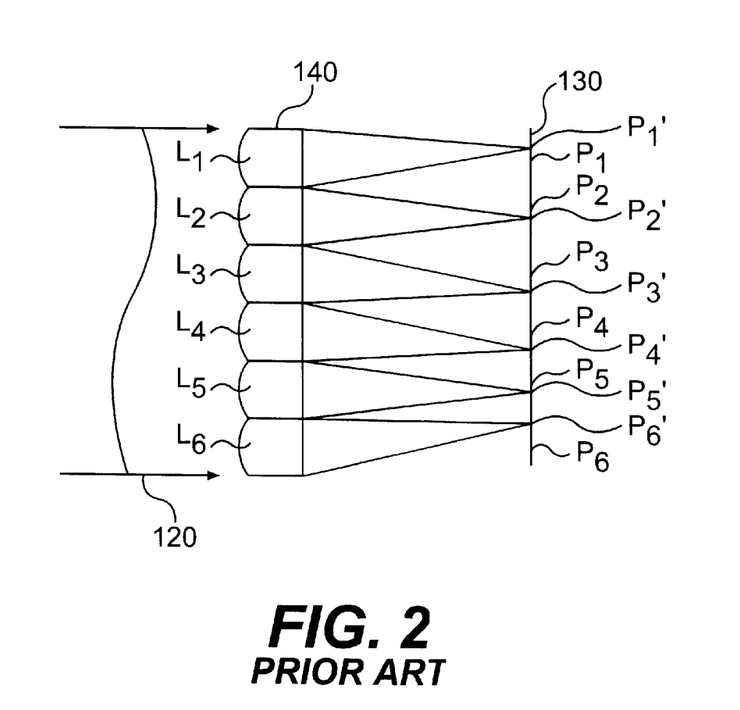
FIG. 2 is a schematic side view of a distorted wavefront entering a conventional wavefront sensor.

In a practical world, however, incoming wavefront 120 is oftentimes distorted, represented by a curved line or inverted "S" curve shown exaggerated in FIG. 2 for illustration purposes. Lens array 140 splits incoming wavefront 120 into a series of subapertures, each of which creates a focal point (one of $P'_1$–$P'_6$) on detector 130. Distorted wavefront 120 has a wide collection of propagation directions and lens array 140 focuses wavefront 120 into different positions of focal points $P'_1$–$P'_6$ on detector 130. For example, focal points $P'_1$ and $P'_6$ are above nominal focal points $P_1$ and $P_6$, respectively, because the segment of wavefront 120 in front of lenses $L_1$ and $L_6$ have a negative slope, are slanted to the left, or having a backward slash configuration (\). Conversely, focal points $P'_3$ and $P'_4$ are below nominal focal points $P_3$ and $P_4$, respectively, because the segment of wavefront 120 in front of lenses $L_3$ and $L_4$ have a positive slope, are slanted to the right, or having a forward slash configuration (\). The more negative the slope is, the further upward the focal point falls from the corresponding nominal focal point on the detector. Similarly, the more positive the slope is, the further downward the focal points falls from the corresponding nominal focal point on the detector.

The conventional wavefront sensor described above poses a problem that when the incoming wavefront is overly distorted, such that the local focal point is either too high or too low from the nominal or reference focal point, the focal point misses the local detecting field and is detected by a neighboring detecting field of the detector. The detector assigned to measure focal point of the local detecting field is confused with the measurement readings of the neighboring detecting fields. Therefore, when incoming wavefront is distorted beyond the dynamic range of the detector, the measurement reading of the detector becomes meaningless.

In light of the foregoing, there is a need for a wavefront sensor which has a large dynamic range to enable an easy and accurate measurement of the tilt angle and the degree of focus of incoming wavefront. In addition, the wavefront sensor needs to have a compact design and be insensitive to external disturbances.

SUMMARY OF THE INVENTION

The advantages and purposes of the invention will be set forth in part in the description which follows, and in part will be obvious from the description, or may be learned by practice of the invention. The advantages and purposes of the invention will be realized and attained by the elements and combinations particularly pointed out in the appended claims.

To attain the advantages and in accordance with the purposes of the invention, as embodied and broadly described herein, one aspect of the invention is an apparatus for determining characteristics of an incoming energy beam. The apparatus comprises a multi-lens array, a screen, and a beam detector. The multi-lens array focuses the energy beam to a multiple focal points. The screen, positioned adjacent to the multi-lens array, has at least one aperture to allow a portion of the energy beam to pass. Each aperture is aligned with a lens of the multi-lens array. The screen blocks the remainder of the energy beam from arriving at the multi-lens array. The beam detector detects at least one focal point of the energy beam passing through the corresponding at least one aperture and determines the characteristics of the passing energy beam with respect of a reference beam.

Another aspect of the invention is an apparatus for determining characteristics of an incoming energy beam including a multi-lens array and a beam detector. The multi-lens array focuses the energy beam to a multiple focal points. The beam detector detects the focal points and determines the characteristics of the passing energy beam with respect of a reference beam. The apparatus comprises a screen positioned adjacent to the multi-lens array. The screen has at least one aperture to allow a portion of the energy beam to pass. Each aperture is aligned with a lens of the multi-lens array. The screen blocks the remainder of the energy beam from arriving at the multi-lens array.

Yet another aspect of the invention is a method for determining characteristics of an incoming energy beam. The method comprises the steps of providing a screen having at least one aperture, passing a portion of the energy beam through the at least one aperture to arrive at and be focused by corresponding at least one lens of a multi-lens array, blocking the remainder of the energy beam from arriving at the multi-lens array; and determining characteristics of the focused energy beam with respect to a reference beam.

A further aspect of the invention is a method for making an apparatus to determine characteristics of an incoming energy beam. The method comprises the steps of providing a screen and providing a beam detector. The screen is for allowing a portion of the energy beam to pass through at least one aperture on the screen and arrive at corresponding at least one lens of a multi-lens array. The screen blocks the remainder of the energy beam from arriving at the multi-lens array. The multi-lens array focuses the passing energy beam to corresponding at least one focal point. The detector is for detecting the at least one focal point to determine the characteristics of the passing energy beam.

It is to be understood that both the foregoing general description and the following detailed description are exemplary and explanatory only and are not restrictive of the invention as claimed. Additional advantages will be set forth in the description which follows, and in part will be understood from the description, or may be learned by practice of the invention. The advantages and purposes may be obtained by means of the combinations set forth in the attached claims.

BRIEF DESCRIPTION OF THE DRAWINGS

The accompanying drawings, which are incorporated in and constitute a part of this specification, illustrate several embodiments of the invention and, together with the description, serve to explain the principles of the invention. In the drawings.

DESCRIPTION OF THE INVENTION

Reference will now be made in detail to several embodiments of the invention, examples of which are illustrated in the accompanying drawings. Wherever possible, the same reference numbers will be used throughout the drawings to refer to the same or like parts. The invention will be further clarified by the following examples, which are intended to be exemplary of the invention.

A wavefront sensor consistent with the principles of this invention is useful to determine characteristics of incoming wavefront, including a tilt angle and a degree of focus. More particularly, the wavefront sensor of the present invention is capable of determining characteristics of incoming wavefront that is highly distorted that renders the measurement reading of a conventional wavefront sensor meaningless. Such a wavefront sensor is applicable in many fields involving transmission of energy beam, for instance, in a photolithography process. This invention, however, is not limited to such application.

Consistent with the principles of the invention, an apparatus is provided to determine characteristics of an incoming energy beam. The apparatus includes a multi-lens array, a screen, and a beam detector. The multi-lens array focuses the energy beam to a multiple focal points. The screen, positioned adjacent to the multi-lens array, has at least one aperture to allow a portion of the energy beam to pass, and to block the remainder of the energy beam from arriving at the multi-lens array. Each aperture is aligned with a lens of the multi-lens array. The beam detector detects the focal point(s) of the energy beam passing through the corresponding aperture(s) and determines the characteristics of the passing energy beam.

Figure 3A:
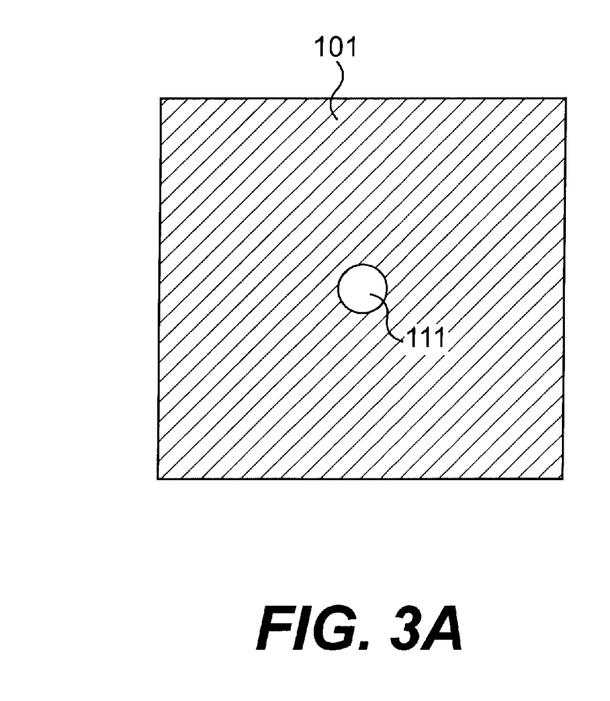
FIG. 3A is a front view of a first embodiment of a screen consistent with the principles of the present invention.
Figure 3B:
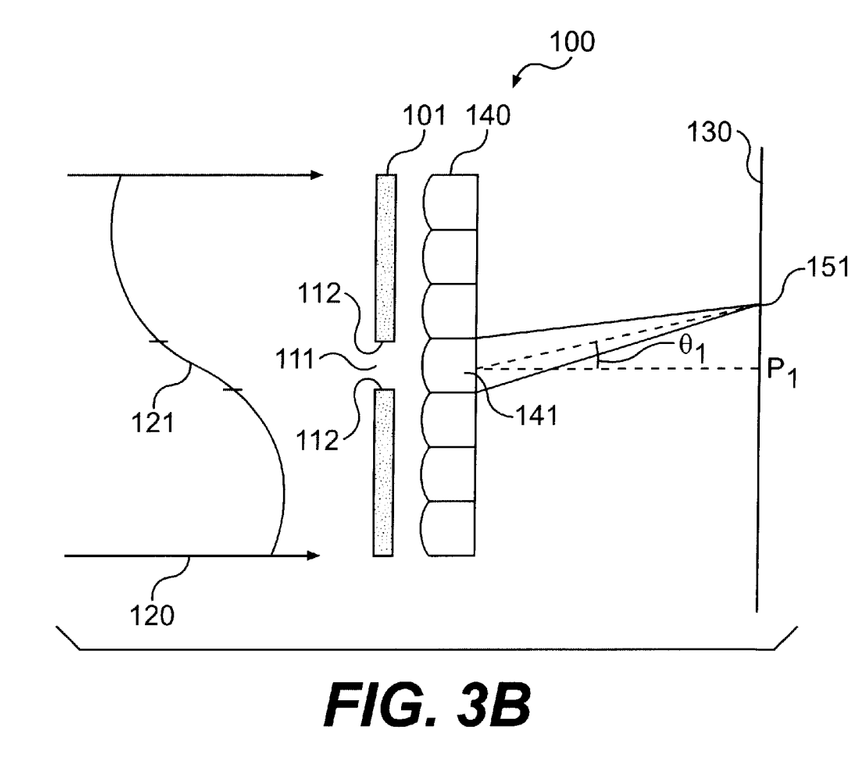
FIG. 3B is a schematic side view of a distorted wavefront entering a first embodiment of the wavefront sensor consistent with the principles of the present invention.

In the illustrated embodiment and as shown in FIGS. 3A and 3B, a wavefront sensor 100 includes a multi-lens array 140 to focus highly distorted incoming energy beam 120 onto a beam detector 130. A screen 101 having a single aperture 111 allows a beam segment 121 of energy beam 120 to pass through a lens 141 of multi-lens array 140, while blocking the remainder of beam 120 from arriving at multi-lens array 140.

Consistent with the principles of the present invention, because only beam segment 121 passes through lens 141, the whole field of detector 130 may be utilized to detect focal point 151 and to measure local tilt angle $\Theta_1$ of beam segment 121 with respect to a corresponding reference beam or nominal focal point $P_1$. Detector 130 need not be assigned to any detecting fields. Incoming wavefront 120 or segment 121 thereof can be as distorted as possible because focal point 151 may fall anywhere on the field of detector 130 and the measurement reading will not be confusing since there is no neighboring fields for focal point 151 to fall to. Thus, wavefront sensor 100 has a large dynamic range for detecting and measuring highly distorted incoming wavefront. In one embodiment, wavefront sensor 100 may have a dynamic range as large as 100 μm.

Aperture 111 is preferably aligned with lens 141 and preferably has an opening size that is slightly smaller than the diameter of lens 141 to sufficiently block other beam segments from arriving at multi-lens array 140 and to assure only a single focal point 151 is resulted. Aperture 111 may be located anywhere on screen 101, but for optimum blocking purposes, aperture 111 may be centrally located on screen 101. Aperture 111 may have any configurations, including a circle, a square, or a rectangle. FIG. 3A shows aperture 111 having a circular configuration.

Screen 101 may have a square, or rectangular configuration with a length and a width sufficient to block the entire multi-lens array 140. Alternatively, screen 101 may have a circular configuration with a diameter sufficient to block the entire multi-lens array 140. Aperture 111 is not limited to any size or configuration. In one embodiment, the thickness of screen 101 is approximately one tenth of the opening size of aperture 111 to avoid tunnel effect of beam segment 121 such that beam segment 121 bounces off surface 112 of aperture 111 as segment 121 passes through screen 101. For example, if the diameter of lens 141 is approximately 200 μm, then aperture 111, if circular, may have a diameter, or, if square, have a diagonal in a range of 190 μm or less, and screen 101 may have a thickness in a range of 19 μm or less.

Screen 101 can be made of any material capable of blocking incoming energy beam 120. Energy beam 120 could be any electro magnetic (EM) wave, including X-ray beam, ultra violet light, visible light, infra red light, and laser beam which includes a variety of EM wave. The screen material is preferably an opaque material to block the EM wave from arriving at multi-lens array 140. The screen material may depend on the type of energy beam being used. For example, for a laser beam, material such as, tungsten (W) may be used as screen 101. Alternatively, for X-ray beam and ultra violet light, material such as gold (Au) and tungsten (W) may be used as screen 101. For light beam, material such as chrome (Cr) may be used as screen 101.

Screen 101 is preferably located as close to multi-lens array 140 as possible without touching or scratching array 140, because multi-lens array 140 is generally a very sensitive and expensive piece of equipment. Multi-lens array 140 and detector 130 are commonly integrated as one piece of equipment such as a camera or a CCD. Screen 101 may be supported by a frame (not shown) and attached to multi-lens array 140 by fasteners (also not shown) such as screws, bolts, clamps, or adhesives. Alternatively, screen 101 may be built as an integral unit of the camera or the CCD embodying multi-lens array 140 and detector 130.

Figure 4A:
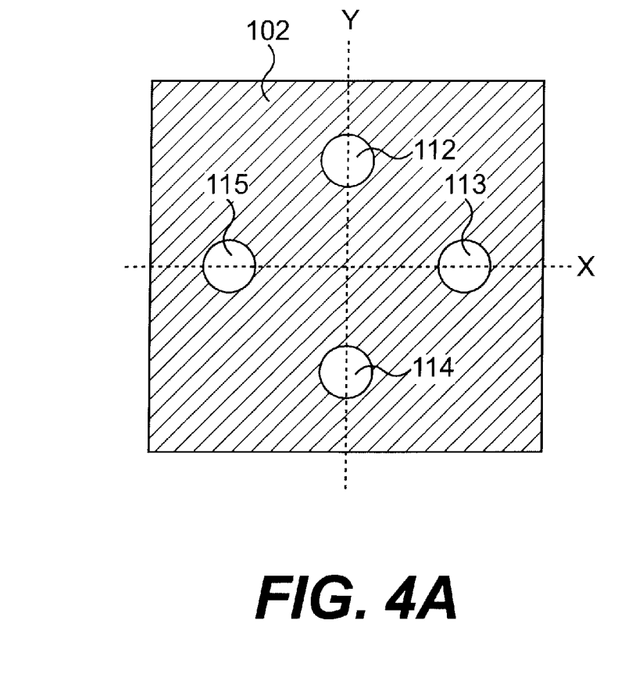
FIG. 4A is a front view of a second embodiment of a screen consistent with the principles of the present invention.
Figure 4B:
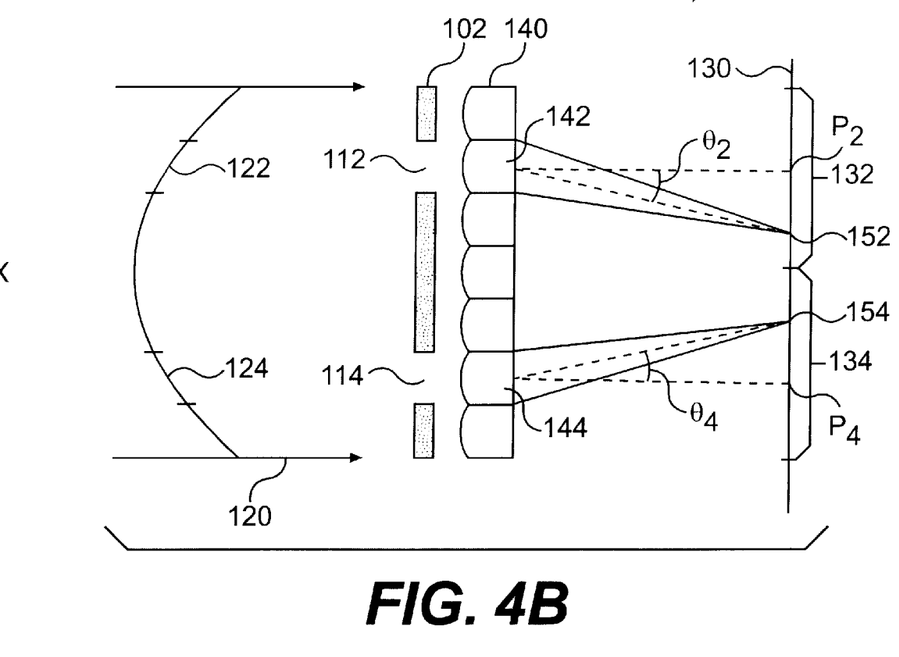
FIG. 4B is a schematic side view of a distorted wavefront entering a second embodiment of the wavefront sensor consistent with the principles of the present invention.

In the illustrated embodiment and as shown in FIGS. 4A and 4B, a wavefront sensor 100 includes a multi-lens array 140 to focus incoming energy beam 120 onto a beam detector 130. A screen 102, having a plurality of apertures (four are shown) 112, 113, 114, and 115, allows beam segments 122 and 124 of energy beam 120 to pass through a plurality of lens 142 and 144 of multi-lens array 140, while blocking the remainder of beam 120 from arriving at multi-lens array 140.

Consistent with the principles of the present invention, beam segments 122 and 124 pass through apertures 112 and 114, respectively, to arrive at lens 142 and 144, respectively, and are focused as focal points 152 and 154, respectively. Detector 130 is assigned to a plurality of fields to correspond with the plurality of apertures 112, 113, 114, and 115. Only fields 132 and 134 are shown to correspond with apertures 112 and 114, respectively.

Apertures 112 and 114, aligned along a first direction y, are separated by a sufficient distance to assure that detector fields 132 and 134 assigned to detect focal points 152 and 154, respectively, will be able to detect highly distorted beam segments 122 and 124, and will not confuse the readings between each field. In one embodiment, apertures 112 and 114 may be separated by a distance of approximately 70% of the overall length of screen 102 along first direction y. Likewise, apertures 113 and 115, aligned in a second direction x, may be separated by a distance of approximately 70% of the overall length of screen 112 along second direction x. For example, when beam detector 130, such as a CCD, has a rectangular area of 10 mm×10 mm, screen 102 may have a rectangular configuration of 12 mm×12 mm to sufficiently block wavefront 120, then the centers of apertures 112 and 114 may be separated by approximately 8.4 mm. Similarly, apertures 113 and 115, aligned along a second direction x, may also be separated by approximately 8.4 mm.

By measuring the local tilt angles $\Theta_2$ and $\Theta_4$ of beam segments 122 and 124, a degree of focus or an overall radius of curvature of wavefront 120 can be determined by integrating the measurement readings of tilt angles $\Theta_2$ and $\Theta_4$ over detecting fields 132 and 134. As illustrated in FIG. 4B, when focal point 152 is below nominal focal point $P_2$, then beam segment 122 has a positive gradient, is slanted to the right, or having a forward slash configuration; meanwhile focal point 154 is above nominal focal point $P_4$ then beam segment 124 has a negative gradient, is slanted to the left, or having a backward slash configuration. Therefore, based on the readings of tilt angles $\Theta_2$ and $\Theta_4$, the degree of focus or the radius of curvature of incoming wavefront 120 over detecting fields 132 and 134 can be determined, which in this embodiment is illustrated as having a "C" configuration.

Figure 4C:
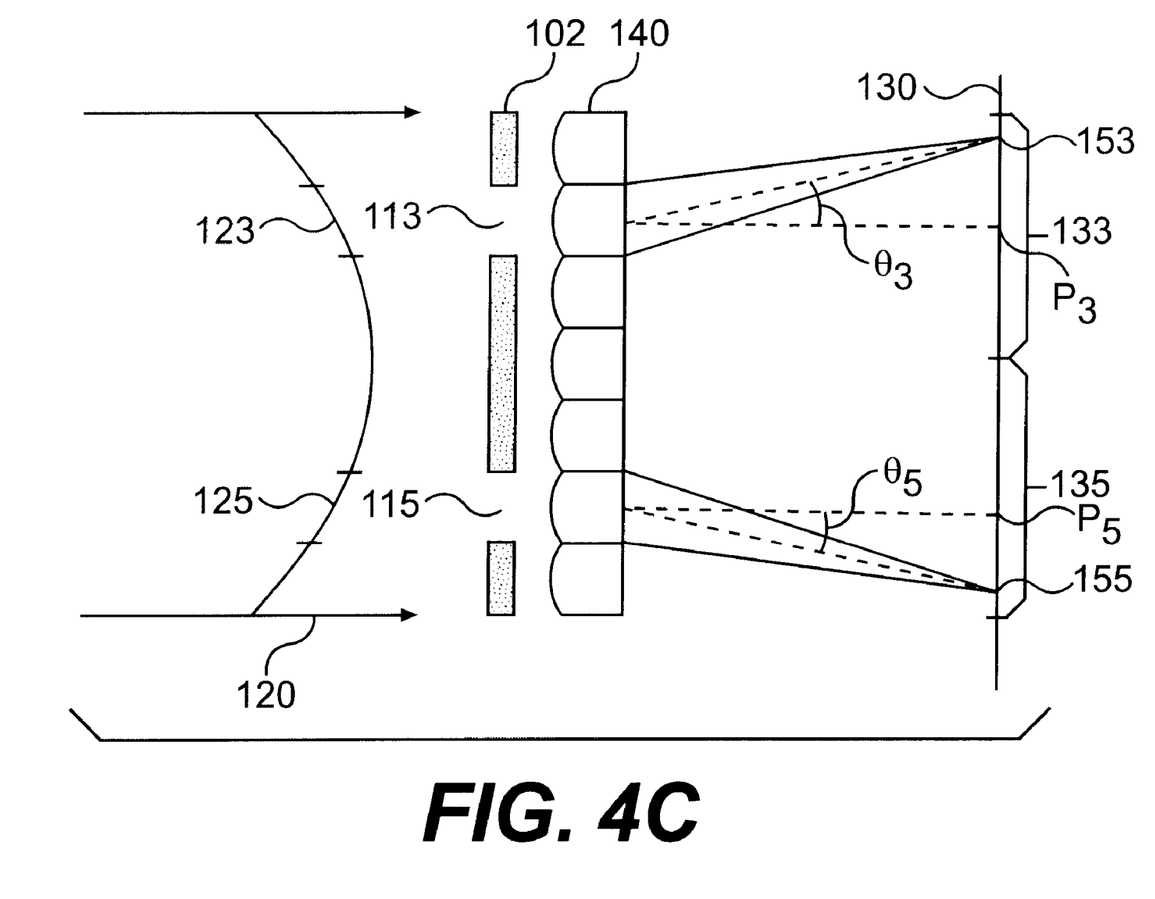
FIG. 4C is a schematic side view of a distorted wavefront entering the second embodiment of the wavefront sensor consistent with the principles of the present invention.

Conversely, as illustrated in FIG. 4C, when focal point 153 is above nominal focal point $P_3$ then tilt angle $\Theta_3$ of beam segment 123 has a negative gradient, is slanted to the left, or having a backward slash configuration; while focal point 155 is below nominal focal point $P_5$, then beam segment 125 has a positive gradient, is slanted to the right, or having a forward slash configuration. Therefore, based on the readings of tilt angles $\Theta_3$ and $\Theta_5$, the degree of focus or the radius of curvature of incoming wavefront 120 over detecting fields 133 and 135 can be determined, which in this embodiment is illustrated as having a reverse "C" configuration.

Although four apertures are shown, screen 102 may contain more than four apertures as long as the following conditions are met: a first set of at least two apertures aligning in first direction y to determine the degree of focus of incoming wavefront along first direction y, and a second set of at least two apertures aligning in second direction x to determine the degree of focus of incoming wavefront along second direction x. First and second directions y and x, respectively, need not be perpendicular to each other. Screen 102 may also contain more sets of apertures aligning in directions other than first y and second x directions.

Figure 5:
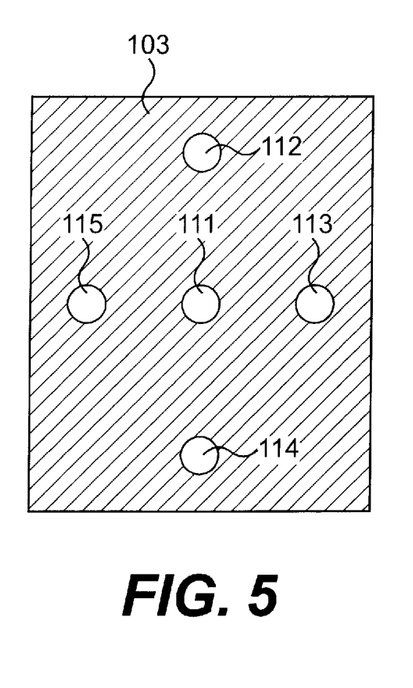
FIG. 5 is a front view of a third embodiment of a screen consistent with the principles of the present invention.

Also consistent with the principles of the present invention, FIG. 5 illustrates screen 103 containing a combination of apertures (five is shown) to simultaneously measure local tilt angles and degrees of focus of an incoming wavefront. Screen 103 contains a plurality of apertures 111, 112, 113, 114, and 115 having a combination of configurations shown in FIGS. 3A and 4A. It can be seen that by combining the configuration of screen 101 and 102, wavefront sensor 100 can measure local tilt angle $\Theta_1$ and simultaneously measure tilt angles $\Theta_2$, $\Theta_3$, $\Theta_4$, and $\Theta_5$ which then can determine radii of curvature in first direction y and second direction x.

In operation, sometimes detector 130 does not detect all focal points 151–155 when incoming wavefront 120 is overly distorted that detector 130 misses to capture all focal points 151–155. For example, detector 130 only captures focal points 151, 152, 153, 155, and misses to capture focal point 154 because focal point 154 falls beyond the dynamic range of detector 130. In this instance, the operator may not realize which focal point is beyond the dynamic range of wavefront sensor 100. In addition, the operator may have a problem in determining that, among the detected focal points 151, 152, 153, 155, which focal point is resulted from aperture 111 and which focal points are resulted from the remaining apertures, 112, 113, and 115.

Figure 6:
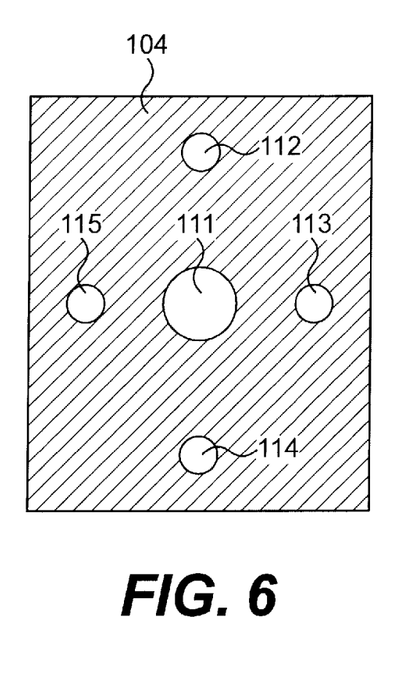
FIG. 6 is a front view of a screen according to another embodiment consistent with the principles of the present invention.

To cure the problem discussed above, an alternate embodiment of screen 104, shown in FIG. 6, is provided to contain a slightly larger aperture 111 as compared with apertures 112, 113, 114, and 115. Therefore, the operator can distinguish focal point 151 resulted from beam segment 121 entering through aperture 111 from focal points 152, 153, 154, 155 resulted from beam segments 122, 123, 124, 125, respectively, entering through apertures 112, 113, 114, 115, respectively.

Figure 7:
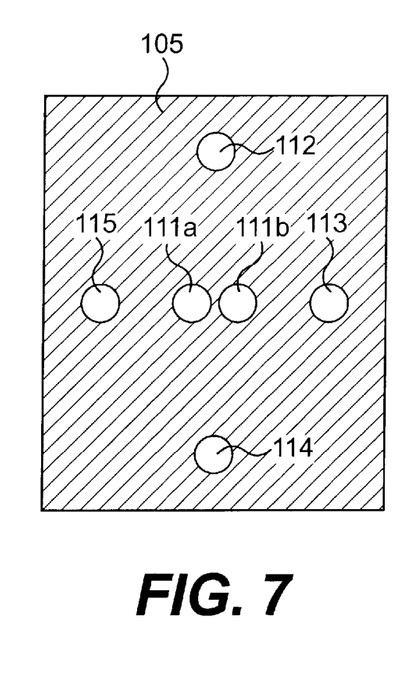
FIG. 7 is a front view of another screen according to another embodiment consistent with the principles of the present invention.

FIG. 7 illustrates another alternate embodiment of screen 105 containing a plurality of sub-apertures positioned closely together, a couple are shown, 111a and 111b, to measure tilt angles $\Theta_{1a}$ and $\Theta_{1b}$, and apertures 112, 113, 114, 115 to measure tilt angles $\Theta_2$, $\Theta_3$, $\Theta_4$, $\Theta_5$, respectively, which subsequently determine degrees of focus of wavefront 120. Similarly, the operator can then distinguish the couple of focal points resulted from beam segment 121a and 121b, respectively, entering through apertures 111a and 111b, from focal points 152, 153, 154, 155 resulted from beam segments 122, 123, 124, 125, respectively entering through apertures 112, 113, 114, 115, respectively.

Figure 8:
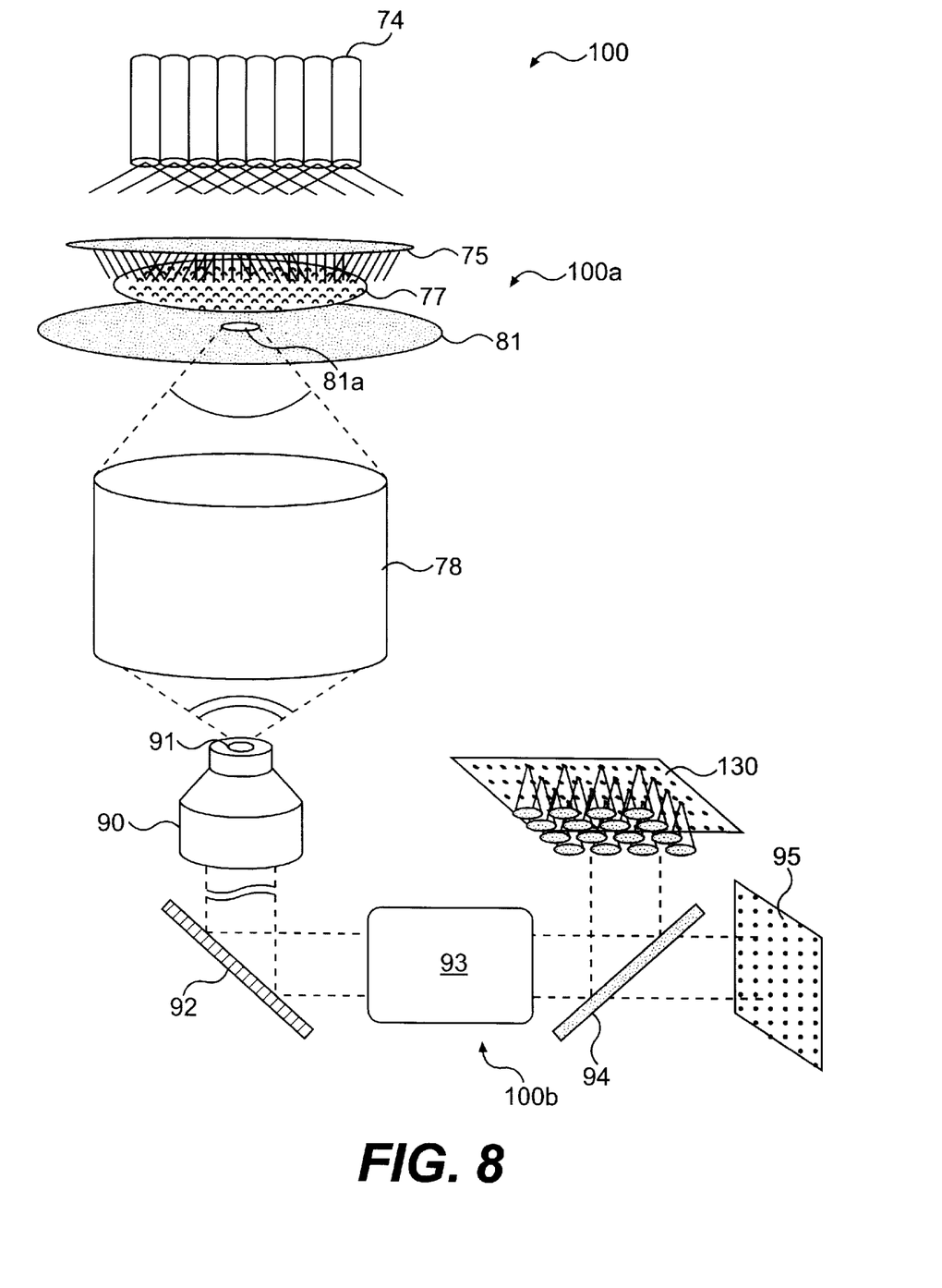
FIG. 8 is an elevation view of a wavefront sensor consistent with the principles of the present invention.

Wavefront sensor 100 is particularly useful in determining characteristics, including tilt angles and degrees of focus, of incoming energy beam, and can be applied in an exposure apparatus in a photolithography process. FIG. 8 illustrates a structure of wavefront sensor 100 consistent with the principles of the present invention which may be incorporated into an exposure apparatus 21 illustrated in FIG. 9 of a photolithography system to manufacture semiconductor wafers.

As illustrated in FIG. 8, wavefront sensor 100 comprises a first member 100a disposed on the side of an objective plane of lens assembly 78, and a second member 100b disposed on the side of an image plane of lens assembly 78. First member 100a includes a diffuser 77 to diffuse energy beam from a condenser 75 and a test reticle 81. Test reticle 81 has an aperture 81a in approximately the center thereof. Test reticle 81 is generally used to generate a spherical wavefront which is incident onto projection lens assembly 78 to measure the shape of the wavesurface of light passing through projection lens assembly 78. Test reticle 81 and diffuser 77 of first member 100a may be mounted on a first support unit (not shown).

Second member 100b includes an objective lens 90, a mirror 92, a relay lens 93, a half mirror 94, and at least one CCD camera. The energy beam entering lens assembly 78 is incident on objective lens 90 via a pinhole 91. Pinhole 91 is disposed on the side of an image plane of lens assembly 78. The energy beam exiting objective lens 90 is reflected off of mirror 92, then passes through relay lens 93. Second member 100b including all elements thereof may be supported in a second support unit (not shown).

In the embodiment shown in FIG. 8, a plurality of focal spots are focused on CCD 130, while the shape of the pupil of lens assembly 78 is projected on CCD 95. CCD 95 is disposed conjugate to the pupil of lens assembly 78. CCD 95 detects the bright portion of the pupil of lens assembly, i.e., the core of the optical axis of lens assembly 78, from the shape of the pupil of lens assembly 78. The central positions of CCD 130 and CCD 95 are aligned to match their coordinate positions. The output signals from CCD 130 and CCD 95 are processed to determine characteristics of the incoming energy beam.

Figure 9:
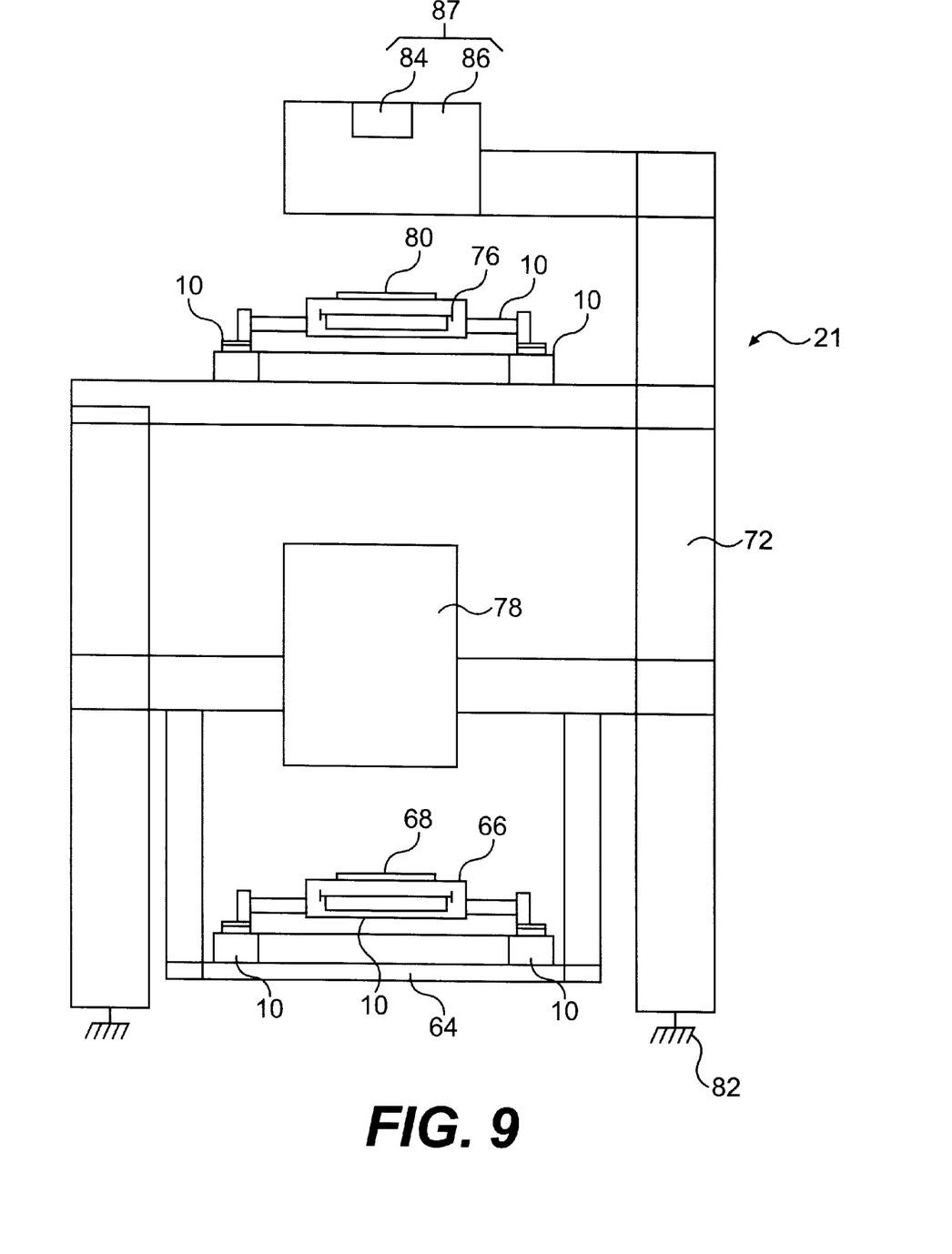
FIG. 9 is an elevation view of an exposure apparatus utilizing a wavefront sensor having features of the present invention.

As illustrated in FIG. 9, exposure apparatus 21 transfers a pattern of an integrated circuit from reticle 80 onto semiconductor wafer 68. Exposure apparatus 21 may be mounted to a base 82, i.e., a floor or the ground or some other supporting structure.

Apparatus frame 72 is rigid and supports the components of the exposure apparatus 21. The design of the apparatus frame 72 can be varied to suit the design requirements for the rest of exposure apparatus 21. Apparatus frame 72 supports reticle stage 76, wafer stage 66, lens assembly 78, and illumination system 87 above base 64. Alternatively, for example, separate, individual structures (not shown) can be used to support wafer stage 66 and reticle stage 76, illumination system 87, and lens assembly 78 above base 64.

Wavefront sensor 100 consistent with the principles of the present invention may be utilized to determine the characteristics of energy beam, for instance, as it exits illumination system 87 or of lens assembly 78. Therefore, when the energy beam is distorted, wavefront sensor 100 with any of screens 101, 102, 103, 104, 105, can measure the tilt angles and degrees of focus of the distorted beam, and can make the necessary correction to focus the energy beam arriving at semiconductor wafer 68.

Illumination system 87 may include an illumination source 84 and an illumination optical assembly 86. Illumination source 84 emits the beam (irradiation) of light energy. Illumination optical assembly 86 guides the beam of light energy from illumination source 84 to lens assembly 78. The illumination optical assembly 86 includes a flyeye lens 74 and condenser lens 75 (shown in FIG. 4). The beam illuminates selectively different portions of reticle 80 and exposes wafer 68. In FIG. 9, illumination source 84 is illustrated as being supported above reticle stage 76. Typically, however, illumination source 84 is secured to one side of apparatus frame 72 and the energy beam from illumination source 84 is directed to above reticle stage 76 with illumination optical assembly 86.

Lens assembly 78 projects and/or focuses the light passing through reticle 80 to wafer 68. Depending upon the design of apparatus 21, lens assembly 78 can magnify or reduce the image illuminated on reticle 80.

Reticle stage 76 holds and precisely positions reticle 80 relative to lens assembly 78 and wafer 68. Somewhat similarly, wafer stage 66 holds and positions wafer 68 with respect to the projected image of the illuminated portions of reticle 80. In the embodiment illustrated in FIG. 9, wafer stage 66 and reticle stage 76 are positioned by a plurality of motors 10. Depending upon the design, apparatus 21 can also include additional servo drive units, linear motors and planar motors to move wafer stage 66 and reticle stage 76.

There are a number of different types of photolithographic devices. For example, exposure apparatus 21 can be used as a scanning type photolithography system which exposes the pattern from reticle 80 onto wafer 68 with reticle 80 and wafer 68 moving synchronously. In a scanning type lithographic device, reticle 80 is moved perpendicular to an optical axis of lens assembly 78 by reticle stage 76 and wafer 68 is moved perpendicular to an optical axis of lens assembly 78 by wafer stage 66. Scanning of reticle 80 and wafer 68 occurs while reticle 80 and wafer 68 are moving synchronously.

Alternatively, exposure apparatus 21 can be a step-and-repeat type photolithography system that exposes reticle 80 while reticle 80 and wafer 68 are stationary. In the step and repeat process, wafer 68 is in a constant position relative to reticle 80 and lens assembly 78 during the exposure of an individual field. Subsequently, between consecutive exposure steps, wafer 68 is consecutively moved by wafer stage 66 perpendicular to the optical axis of lens assembly 78 so that the next field of semiconductor wafer 68 is brought into position relative to lens assembly 78 and reticle 80 for exposure. Following this process, the images on reticle 80 are sequentially exposed onto the fields of wafer 68 so that the next field of semiconductor wafer 68 is brought into position relative to lens assembly 78 and reticle 80.

However, the use of exposure apparatus 21 provided herein is not limited to a photolithography system for semiconductor manufacturing. Exposure apparatus 21, for example, can be used as an LCD photolithography system that exposes a liquid crystal display device pattern onto a rectangular glass plate or a photolithography system for manufacturing a thin film magnetic head. Further, the present invention can also be applied to a proximity photolithography system that exposes a mask pattern by closely locating a mask and a substrate without the use of a lens assembly. Additionally, the present invention provided herein can be used in other devices, including other semiconductor processing equipment, elevators, electric razors, machine tools, metal cutting machines, inspection machines and disk drives.

The illumination source 84 can be g-line (436 nm), i-line (365 nm), KrF excimer laser (248 nm), ArF excimer laser (193 nm) and $F_2$ laser (157 nm). Alternately, illumination source 84 can also use charged particle beams such as x-ray and electron beam. For instance, in the case where an electron beam is used, thermionic emission type lanthanum hexaboride ($LaB_6$) or tantalum (Ta) can be used as an electron gun. Furthermore, in the case where an electron beam is used, the structure could be such that either a mask is used or a pattern can be directly formed on a substrate without the use of a mask.

In terms of the magnification of lens assembly 78 included in the photolithography system, lens assembly 78 need not be limited to a reduction system. It could also be a 1x or magnification system.

With respect to lens assembly 78, when far ultra-violet rays such as the excimer laser is used, glass materials such as quartz and fluorite that transmit far ultra-violet rays is preferable to be used. When the $F_2$ type laser or x-ray is used, lens assembly 78 should preferably be either catadioptric or refractive (a reticle should also preferably be a reflective type), and when an electron beam is used, electron optics should preferably comprise electron lenses and deflectors. The optical path for the electron beams should be in a vacuum.

Also, with an exposure device that employs vacuum ultra-violet radiation (VUV) of wavelength 200 nm or lower, use of the catadioptric type optical system can be considered. Examples of the catadioptric type of optical system include the disclosure Japan Patent Application Disclosure No. 8-171054 published in the Official Gazette for Laid-Open Patent Applications and its counterpart U.S. Pat. No. 5,668,672, as well as Japan Patent Application Disclosure No.10-20195 and its counterpart U.S. Pat. No. 5,835,275. In these cases, the reflecting optical device can be a catadioptric optical system incorporating a beam splitter and concave mirror. Japan Patent Application Disclosure No.8-334695 published in the Official Gazette for Laid-Open Patent Applications and its counterpart U.S. Pat. No. 5,689,377 as wall as Japan Patent Application Disclosure No.10-3039 and its counterpart U.S. patent application Ser. No. 873,606 (Application Date: Jun. 12, 1997) also use a reflecting-refracting type of optical system incorporating a concave mirror, etc., but without a beam splitter, and can also be employed with this invention. The disclosures in the above-mentioned U.S. patents, as well as the Japan patent applications published in the Official Gazette for Laid-Open Patent Applications are incorporated herein by reference.

Further, in photolithography systems, when linear motors (see U.S. Pat. Nos. 5,623,853 or 5,528,118) are used in a wafer stage or a mask stage, the linear motors can be either an air levitation type employing air bearings or a magnetic levitation type using Lorentz force or reactance force. Additionally, the stage could move along a guide, or it could be a guideless type stage which uses no guide. The disclosures in U.S. Pat. Nos. 5,623,853 and 5,528,118 are incorporated herein by reference.

Alternatively, one of the stages could be driven by a planar motor, which drives the stage by electromagnetic force generated by a magnet unit having two-dimensionally arranged magnets and an armature coil unit having two-dimensionally arranged coils in facing positions. With this type of driving system, either one of the magnet unit or the armature coil unit is connected to the stage and the other unit is mounted on the moving plane side of the stage.

Movement of the stages as described above generates reaction forces which can affect performance of the photolithography system. Reaction forces generated by the wafer (substrate) stage motion can be mechanically released to the floor (ground) by use of a frame member as described in U.S. Pat. No. 5,528,118 and published Japanese Patent Application Disclosure No. 8-166475. Additionally, reaction forces generated by the reticle (mask) stage motion can be mechanically released to the floor (ground) by use of a frame member as described in U.S. Pat. No. 5,874,820 and published Japanese Patent Application Disclosure No. 8-330224. The disclosures in U.S. Pat. Nos. 5,528,118 and 5,874,820 and Japanese Patent Application Disclosure No. 8-330224 are incorporated herein by reference.

As described above, a photolithography system according to the above described embodiments can be built by assembling various subsystems, including each element listed in the appended claims, in such a manner that prescribed mechanical accuracy, electrical accuracy and optical accuracy are maintained. In order to maintain the various accuracies, prior to and following assembly, every optical system is adjusted to achieve its optical accuracy. Similarly, every mechanical system and every electrical system are adjusted to achieve their respective mechanical and electrical accuracies. The process of assembling each subsystem into a photolithography system includes mechanical interfaces, electrical circuit wiring connections and air pressure plumbing connections between each subsystem. Needless to say, there is also a process where each subsystem is assembled prior to assembling a photolithography system from the various subsystems. Once a photolithography system is assembled using the various subsystems, total adjustment is performed to make sure that every accuracy is maintained in the complete photolithography system. Additionally, it is desirable to manufacture an exposure system in a clean room where the temperature and purity are controlled.

Figure 10:
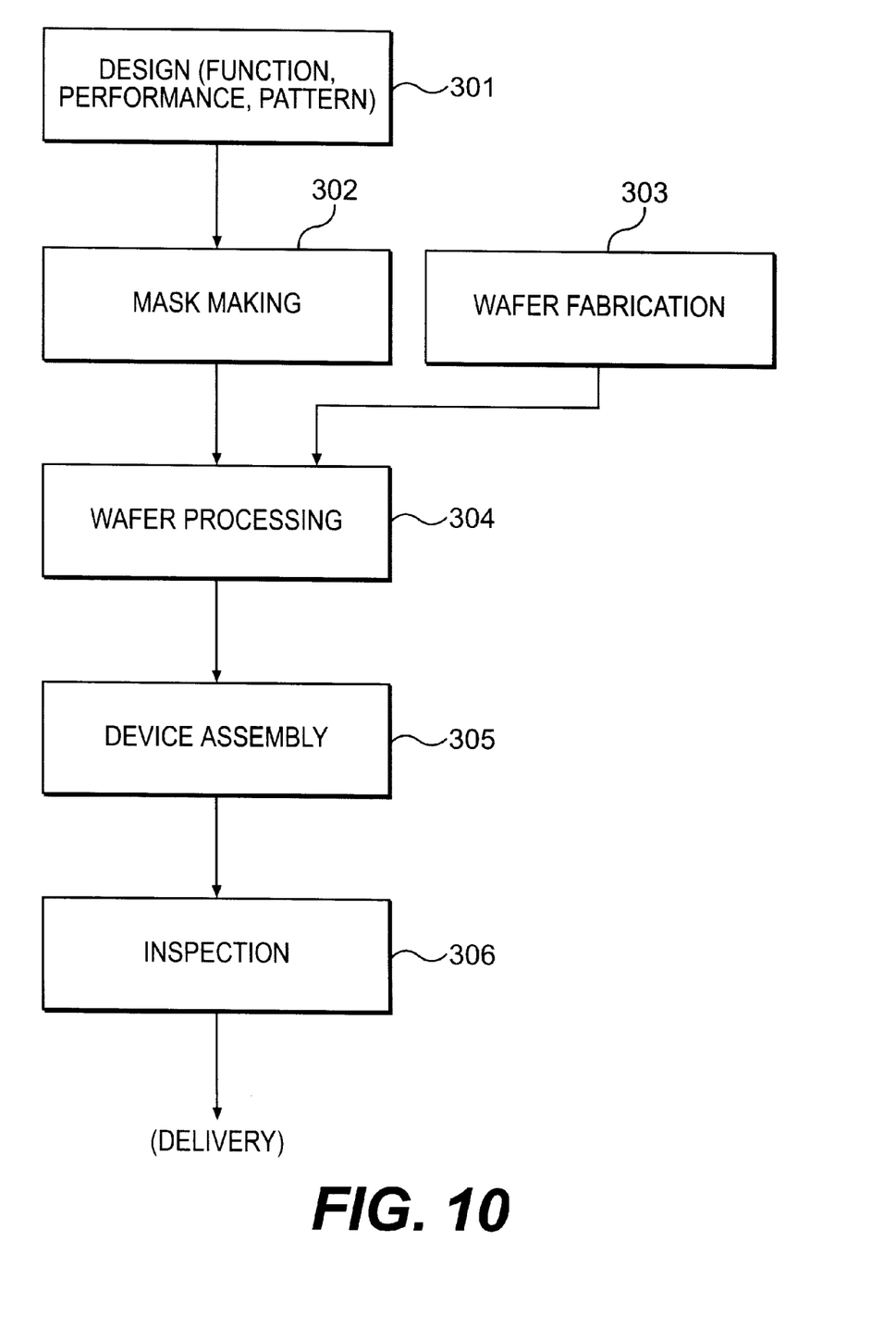
FIG. 10 is a flow chart outlining a process for manufacturing an apparatus in accordance with the present invention.

Further, semiconductor devices can be fabricated using the above described systems, by the process shown generally in FIG. 10. In step 301 the device's function and performance characteristics are designed. Next, in step 302, a mask (reticle) having a pattern is designed according to the previous designing step, and in a parallel step 303, a wafer is made from a silicon material. The mask pattern designed in step 302 is exposed onto the wafer from step 303 in step 304 by a photolithography system described hereinabove consistent with the principles of the present invention. In step 306 the semiconductor device is assembled (including the dicing process, bonding process and packaging process), then finally the device is inspected in step 306.

Figure 11:
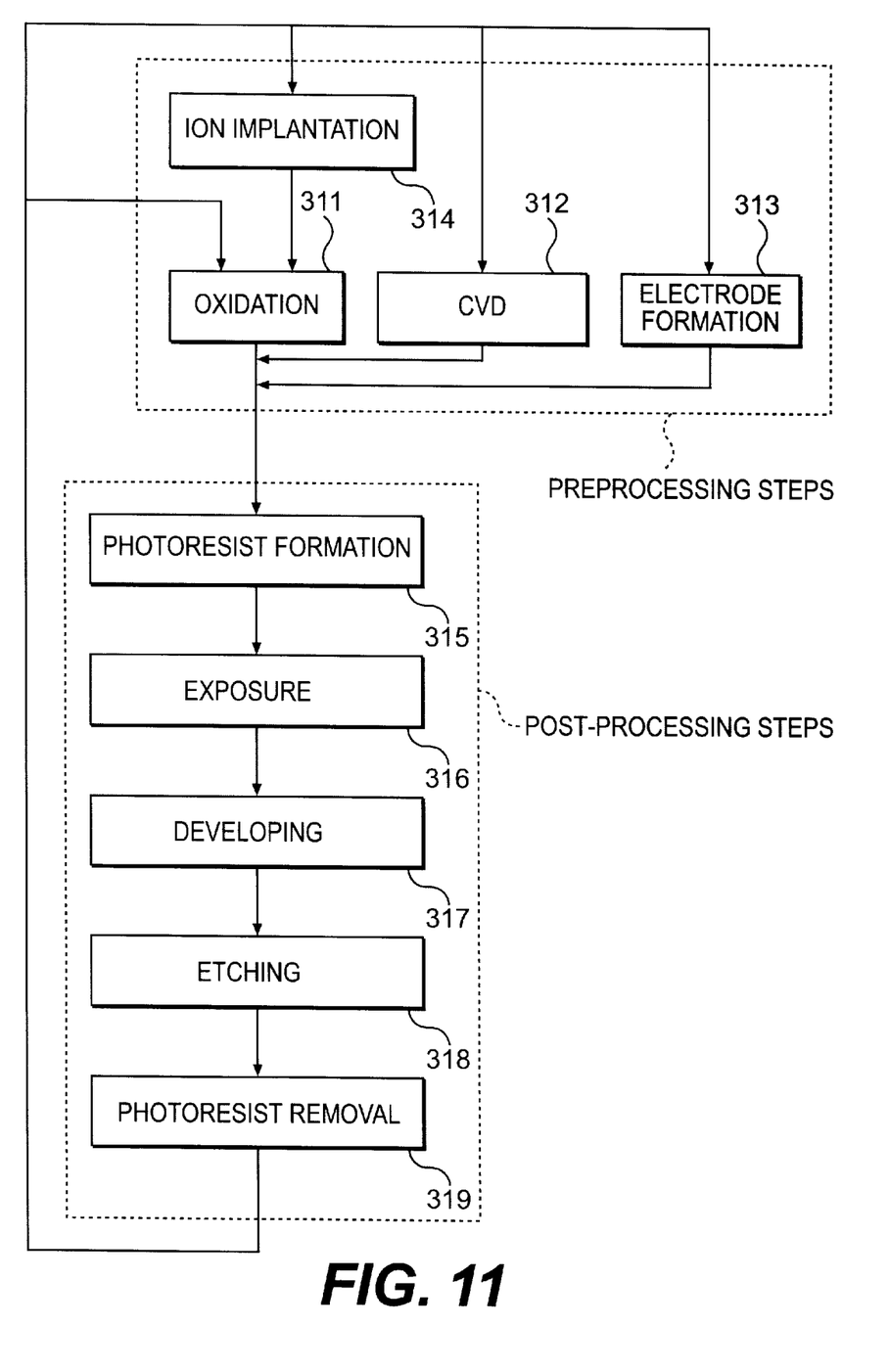
FIG. 11 is a flow chart outlining an apparatus processing in more detail.

FIG. 11 illustrates a detailed flowchart example of the above-mentioned step 304 in the case of fabricating semiconductor devices. In step 311 (oxidation step), the wafer surface is oxidized. In step 312 (CVD step), an insulation film is formed on the wafer surface. In step 313 (electrode formation step), electrodes are formed on the wafer by vapor deposition. In step 314 (ion implantation step), ions are implanted In the wafer. The above mentioned steps 311–314 form the preprocessing steps for wafers during wafer processing, and selection is made at each step according to processing requirements.

At each stage of wafer processing, when the above-mentioned preprocessing steps have been completed, the following post-processing steps are implemented. During post-processing, initially, in step 315 (photoresist formation step), photoresist is applied to a wafer. Next, in step 316, (exposure step), the above-mentioned exposure device is used to transfer the circuit pattern of a mask (reticle) to a wafer. Then, in step 317 (developing step), the exposed wafer is developed, and in step 318 (etching step), parts other than residual photoresist (exposed material surface) are removed by etching. In step 319 (photoresist removal step), unnecessary photoresist remaining after etching is removed.

Multiple circuit patterns are formed by repetition of these preprocessing and post-processing steps.

It will be apparent to those skilled in the art that various modifications and variations can be made in the wavefront sensing apparatus, the material chosen for the present invention, and in the method described herein, as well as other aspects of the invention without departing from the scope or spirit of the invention.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims and their equivalents.

I claim:

1. An apparatus for determining characteristics of an incoming energy beam, comprising:

a multi-lens array to focus the energy beam to multiple focal points;

a screen positioned adjacent to the multi-lens array, the screen having at least one aperture to allow a portion of the energy beam to pass, each aperture being aligned with a corresponding lens of the multi-lens array, the screen blocking the remainder of the energy beam from arriving at the multi-lens array; and a beam detector to detect at least one focal point of the energy beam passing through the corresponding at least one aperture and to determine the characteristics of the passing energy beam.

2. The apparatus of claim 1, wherein the screen comprises:

an aperture to measure a tilt angle of the passing energy beam.

3. The apparatus of claim 2, wherein the aperture is centrally positioned on the screen.

4. The apparatus of claim 1, wherein the screen comprises:

a plurality of apertures to measure a degree of focus of the passing energy beam.

5. The apparatus of claim 4, wherein the screen comprises:

at least two apertures aligned in one direction to determine a degree of focus of the passing energy beam in one dimension; and at least another two apertures aligned in another direction to determine a degree of focus of the passing energy beam in another dimension.

6. The apparatus of claim 5, wherein the one direction and the other direction are perpendicular to each other.

7. The apparatus of claim 1, wherein the screen comprises:

an aperture to measure a tilt angle of the passing energy beam; and a plurality of apertures to measure a degree of focus of the passing energy beam.

8. The apparatus of claim 7, wherein the aperture to measure the tilt angle is centrally positioned on the screen.

9. The apparatus of claim 7, wherein the screen comprises:

at least two apertures aligned in one direction to determine a degree of focus of the passing energy beam in one dimension; and at least another two apertures aligned in another direction to determine a degree of focus of the passing energy beam in another dimension.

10. The apparatus of claim 9, wherein the one direction and the other direction are perpendicular to each other.

11. The apparatus of claim 7, wherein the aperture to measure the tilt angle and the plurality of apertures to measure the degree of focus have the same diameter.

12. The apparatus of claim 7, wherein the aperture to measure the tilt angle has a first diameter, and the plurality of apertures to measure the degree of focus have a second diameter, the first diameter being larger than the second diameter.

13. The apparatus of claim 7, wherein the aperture to measure the tilt angle comprises a plurality of sub-apertures positioned adjacent to each other.

14. The apparatus of claim 13, wherein the plurality of sub-apertures positioned adjacent to each other have a first diameter, and the plurality of apertures to measure the degree of focus have a second diameter, the first diameter being smaller than the second diameter.

15. The apparatus of claim 1, wherein the screen is made of a material capable of blocking the incoming energy beam from penetrating the screen.

16. The apparatus of claim 1, wherein a diameter of the at least one aperture is smaller than a diameter of the lens aligned with the aperture.

17. The apparatus of claim 1, wherein the screen is positioned substantially parallel to the multi-lens array.

18. The apparatus of claim 1, wherein the beam detector is a CCD camera.

19. An apparatus for determining characteristics of an incoming energy beam including a multi-lens array to focus the energy beam to multiple focal points, and a beam detector to detect the focal points and determine the characteristics of the passing energy beam with respect to a reference beam, the apparatus comprising:

a screen positioned adjacent to the multi-lens array, the screen having at least one aperture to allow a portion of the energy beam to pass, each aperture being aligned with a corresponding lens of the multi-lens array, the screen blocking the remainder of the energy beam from arriving at the multi-lens array.

20. The apparatus of claim 19, wherein the screen comprises:

an aperture to measure a tilt angle of the passing energy beam.

21. The apparatus of claim 20, wherein the aperture is centrally positioned on the screen.

22. The apparatus of claim 19, wherein the screen comprises:

a plurality of apertures to measure a degree of focus of the passing energy beam.

23. The apparatus of claim 22, wherein the screen comprises:

at least two apertures aligned in one direction to determine a degree of focus of the passing energy beam in one dimension; and at least another two apertures aligned in another direction to determine a degree of focus of the passing energy beam in another dimension.

24. The apparatus of claim 23, wherein the one direction and the other direction are perpendicular to each other.

25. The apparatus of claim 19, wherein the screen comprises:

an aperture to measure a tilt angle of the passing energy beam; and a plurality of apertures to measure a degree of focus of the passing energy beam.

26. The apparatus of claim 25, wherein the aperture to measure the tilt angle is centrally positioned on the screen.

27. The apparatus of claim 25, wherein the screen comprises:

at least two apertures being aligned in one direction to determine a degree of focus of the passing energy beam in one dimension; and at least another two apertures being aligned in another direction to determine a degree of focus of the passing energy beam in another dimension.

28. The apparatus of claim 27, wherein the one direction and the other direction are perpendicular to each other.

29. The apparatus of claim 25, wherein the aperture to measure the tilt angle and the plurality of apertures to measure the degree of focus have substantially the same diameter.

30. The apparatus of claim 25, wherein the aperture to measure the tilt angle has a first diameter, and the plurality of apertures to measure the degree of focus have a second diameter, the first diameter being larger than the second diameter.

31. The apparatus of claim 25, wherein the aperture to measure the tilt angle comprises a plurality of sub-apertures positioned adjacent to each other.

32. The apparatus of claim 31, wherein the plurality of sub-apertures positioned adjacent to each other have a first diameter, and the plurality of apertures to measure the degree of focus have a second diameter, the first diameter being smaller than the second diameter.

33. The apparatus of claim 19, wherein the screen is made of a material capable of blocking the incoming energy beam from penetrating the screen.

34. The apparatus of claim 19, wherein a diameter of the at least one aperture is smaller than a diameter of the lens aligned with the aperture.

35. The apparatus of claim 19, wherein the screen is positioned substantially parallel to the multi-lens array.

36. A method for determining characteristics of an incoming energy beam, comprising the steps of:

providing a screen having at least one aperture, each aperture being aligned with a corresponding lens of a multi-lens array;

passing a portion of the energy beam through the at least one aperture to arrive at and be focused by the corresponding lens of the multi-lens array;

blocking the remainder of the energy beam from arriving at the multi-lens array; and determining characteristics of the focused energy beam with respect to a reference beam.

37. The method of claim 36, wherein the passing and determining steps further comprise:

passing the portion of the energy beam through a central aperture on the screen to measure a tilt angle of the energy beam;

passing the portion of the energy beam through at least two apertures aligned in one direction on the screen to measure a degree of focus of the energy beam in one dimension; and passing the portion of the energy beam through at least two other apertures aligned in another direction on the screen to measure a degree of focus of the energy beam in another dimension.

38. The method of claim 37, further comprising the step of:

aligning the one direction and the other direction perpendicular to each other.

39. The method of claim 37, further comprising the step of:

setting the aperture to measure the tilt angle and the apertures to measure the degree of focus to have the same diameter.

40. The method of claim 37, further comprising the steps of:

setting the aperture to measure the tilt angle to a first diameter; and setting the apertures to measure the degree of focus to a second diameter, the first diameter being larger than the second diameter.

41. The method of claim 37, wherein the central aperture comprises:

a plurality of apertures positioned adjacent to each other, each having a first diameter; and the apertures to measure the degree of focus have a second diameter, the first diameter being smaller than the second diameter.

42. A method for making an apparatus to determine characteristics of an incoming energy beam, comprising the steps of:

providing a screen for allowing a portion of the energy beam to pass through at least one aperture on the screen, the portion of the energy beam passing through each aperture arriving at a corresponding lens of a multi-lens array, the screen blocking the remainder of the energy beam from arriving at the multi-lens array, the multi-lens array focusing the passing energy beam to a corresponding at least one focal point; and providing a beam detector for detecting the at least one focal point to determine the characteristics of the passing energy beam.

43. The method of claim 42, wherein the steps of providing a screen and providing a beam detector further comprise:

providing a central aperture on the screen, the beam detector detecting at least one corresponding focal point to measure a tilt angle of the energy beam with respect to a reference beam;

providing at least two apertures aligned in one direction on the screen, the beam detector detecting at least two corresponding focal points to measure a degree of focus of the energy beam in one dimension; and providing at least two other apertures aligned in another direction on the screen, the beam detector detecting at least two other corresponding focal points to measure a degree of focus of the energy beam in another dimension.

44. The method of claim 43, further comprising:

aligning the one direction and the other direction to be perpendicular to each other.

45. The method of claim 43, further comprising:

setting the central aperture to measure the tilt angle and the apertures to measure the degree of focus to have the same diameter.

46. The method of claim 43, further comprising:

setting the central aperture to measure the tilt angle at a first diameter; and setting the apertures to measure the degree of focus at a second diameter, the first diameter being larger than the second diameter.

47. The method of claim 43, wherein the central aperture comprises:

a plurality of apertures positioned adjacent to each other each having a first diameter; and the apertures to measure the degree of focus have a second diameter, the first diameter being smaller than the second diameter.

* * * * *